United States Patent [19]

Singh et al.

[11] 4,395,209

[45] Jul. 26, 1983

[54] TIRE PRESS

[75] Inventors: Anand P. Singh, Youngstown, Ohio; Daniel Shichman, Trumbull, Conn.

[73] Assignee: NRM Corporation, Akron, Ohio

[21] Appl. No.: 375,985

[22] Filed: May 7, 1982

Related U.S. Application Data

[60] Division of Ser. No. 255,733, Apr. 20, 1981, Pat. No. 4,338,069, which is a continuation-in-part of Ser. No. 138,658, Apr. 9, 1980, abandoned.

[51] Int. Cl.³ .............................................. B29H 5/02
[52] U.S. Cl. ...................................... 425/33; 425/38; 425/58; 425/40
[58] Field of Search ................... 425/29, 30, 28 R, 33, 425/36, 38, 48, 19, 58, 40; 264/315

[56] References Cited

U.S. PATENT DOCUMENTS

| | | | |
|---|---|---|---|
| Re. 27,060 | 2/1971 | Balle et al. | 264/315 |
| 2,730,763 | 1/1956 | Brundage | 18/17 |
| 2,946,088 | 7/1960 | Soderquist | 425/29 |
| 2,997,738 | 8/1961 | Soderquist | 425/38 X |
| 3,052,920 | 9/1962 | Harris | 425/33 |
| 3,065,503 | 11/1962 | Mallory et al. | 18/17 |
| 3,141,191 | 7/1964 | Soderquist | 18/2 |
| 3,167,810 | 2/1965 | Soderquist | 425/38 X |
| 3,222,715 | 12/1965 | Harris | 18/2 |
| 3,222,716 | 12/1965 | Harris | 18/2 |
| 3,229,329 | 1/1966 | Heston et al. | 18/2 |
| 3,267,515 | 8/1966 | Ulm | 425/29 |
| 3,380,115 | 4/1968 | Soderquist | 18/2 |
| 3,396,221 | 8/1968 | Balle et al | 264/315 |
| 3,477,100 | 11/1969 | Pech et | |
| 3,522,626 | 9/1970 | Balle | |
| 3,550,196 | 12/1970 | Gazuit | |
| 3,579,736 | 5/1971 | Balle et | |
| 3,584,335 | 6/1971 | Ulm et a | |
| 3,640,653 | 2/1972 | Laenen e | |
| 3,790,656 | 2/1974 | Getz | |
| 3,794,457 | 2/1974 | Gazuit | |
| 3,824,048 | 7/1974 | Getz | |
| 3,837,770 | 9/1974 | Gazuit | |
| 3,890,073 | 6/1975 | Getz | |
| 3,976,409 | 8/1976 | Athey | |

| | | | |
|---|---|---|---|
| 4,013,186 | 3/1977 | Barton et al. | 214/660 |
| 4,035,117 | 7/1977 | Nakagawa et al. | 425/19 |
| 4,068,989 | 1/1978 | Cantarutti | 425/38 |
| 4,170,442 | 10/1979 | Singh | 425/38 |
| 4,190,406 | 2/1980 | Geck et al. | 425/38 |
| 4,279,438 | 7/1981 | Singh | 425/38 X |

FOREIGN PATENT DOCUMENTS

| | | |
|---|---|---|
| 215704 | 9/1956 | Australia . |
| 925665 | 5/1973 | Canada . |
| 49-2875 | 1/1974 | Japan . |

Primary Examiner—J. Howard Flint, Jr.
Attorney, Agent, or Firm—Maky, Renner, Otto & Boisselle

[57] ABSTRACT

A tire curing press has a loader assembly comprising a bead grip for engaging and lifting the axial interior of the upper bead of a green tire and a tread positioning ring movable axially to an adjusted position to engage the tire tread shoulder and to force a predetermined distance between the upper bead and tread to identify precisely the transaxial middle or crown plane of the tread. The loader includes means to swing the bead grip and tread register from a tire pick-up position to a load position centered in the press and to position the lower bead of the green tire on or close to a movable toe ring, and then to lower the bead grip, tread register and toe ring uniformly with the green tire held open and firmly therebetween to match the transaxial middle plane of the tread to that of a bladder mounted in a center mechanism in the press by independently movable top and bottom bladder bead clamps. Adjustable mechanical stops and pilots are utilized for obtaining alignment of the movable press components with respect to one an- nodating different sizes of tires :enter mechanism is mounted in a eve, the upper end of which sup- : sleeve is mounted in a well and : mounting well is provided with 1 of coolant therethrough to iso- ism hydraulic actuators mounted )late from the heat generated in 31 Drawing Figures

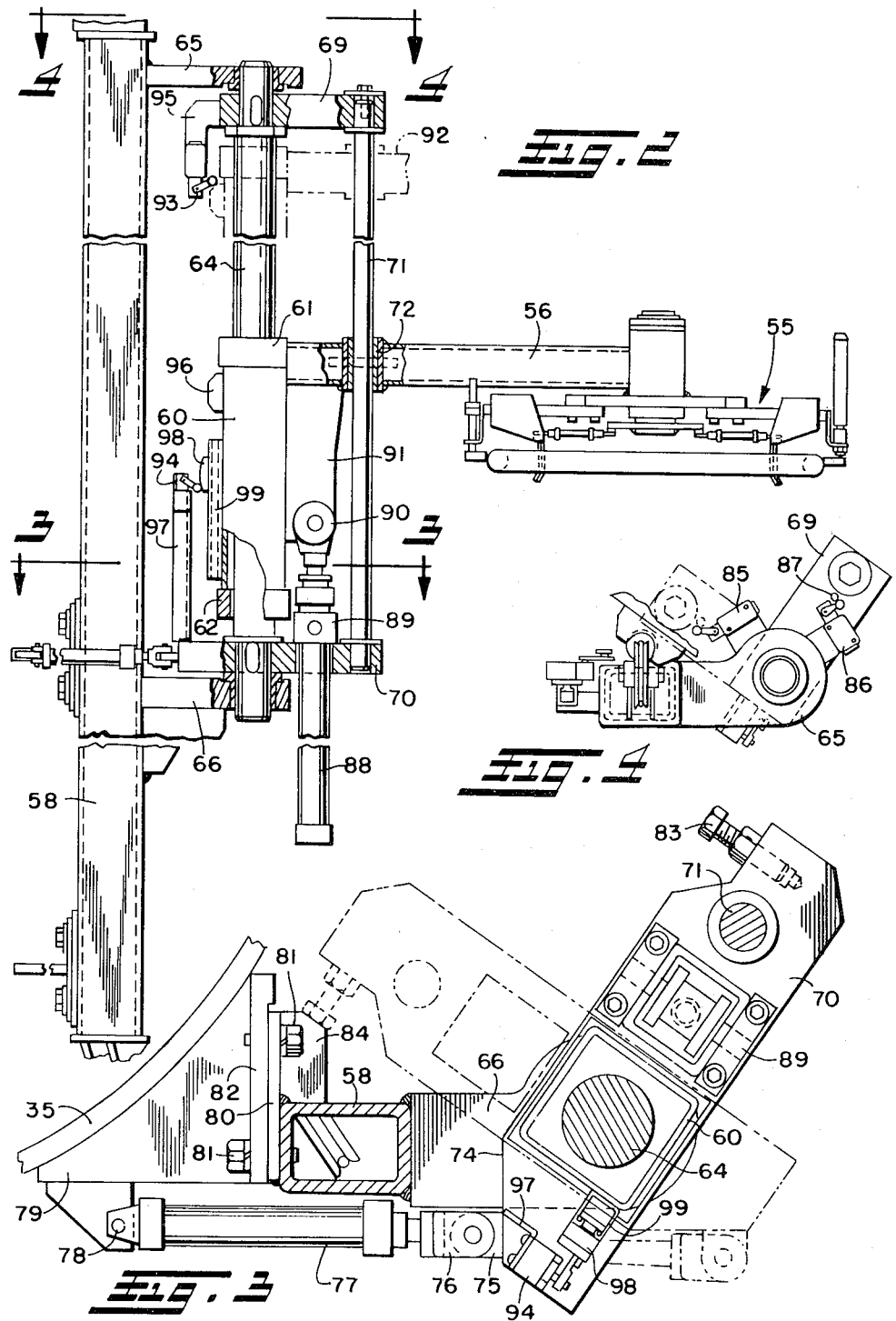

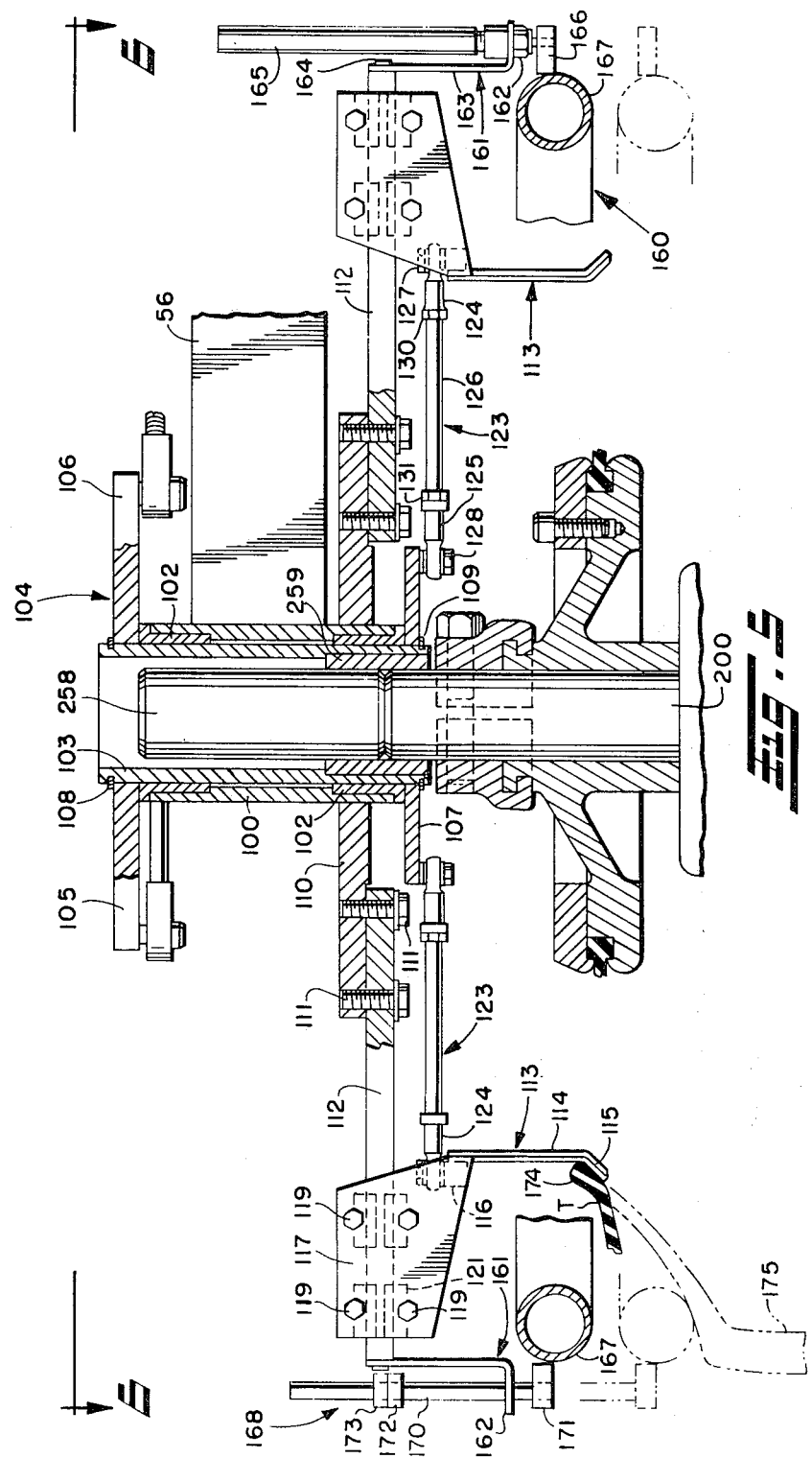

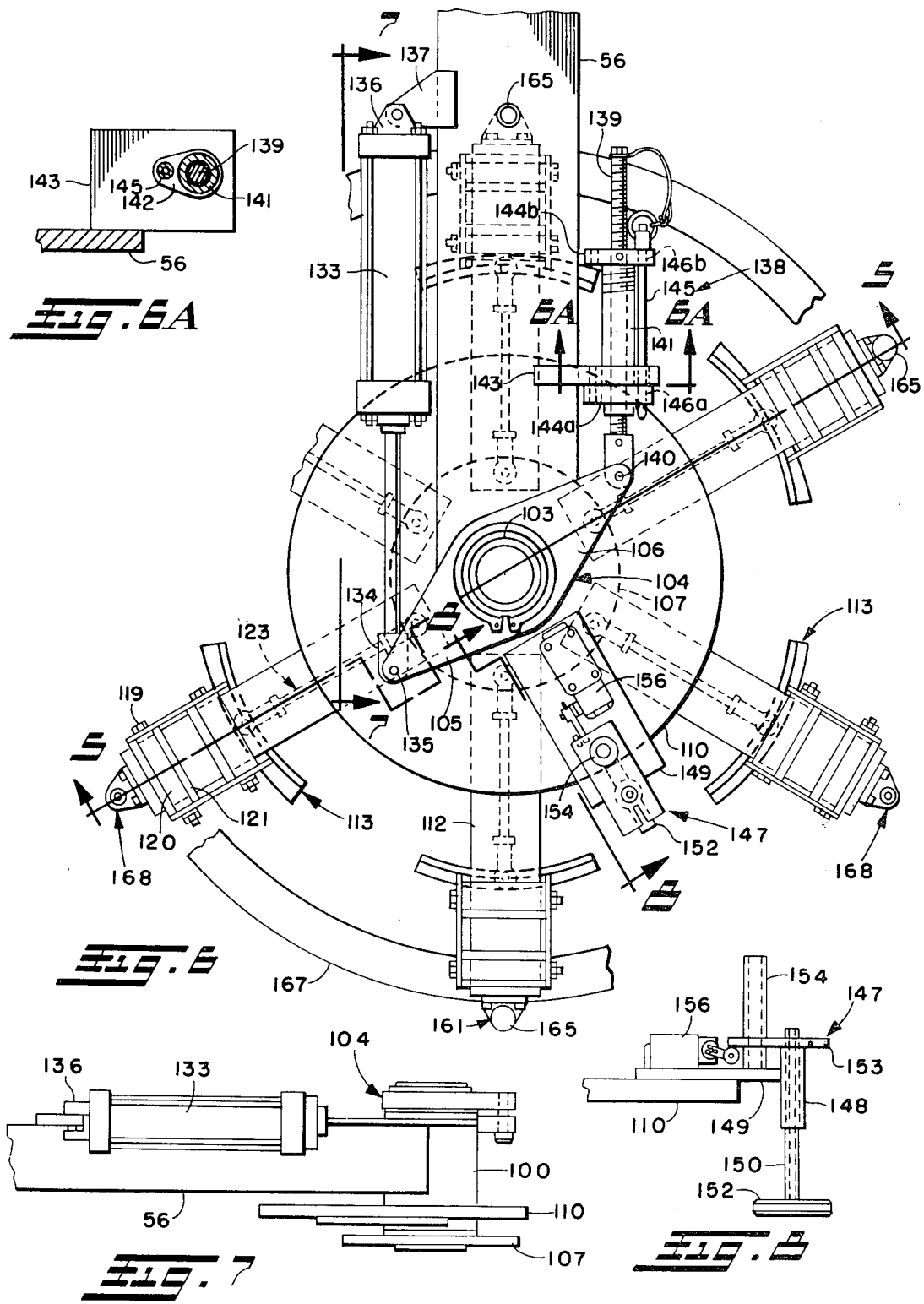

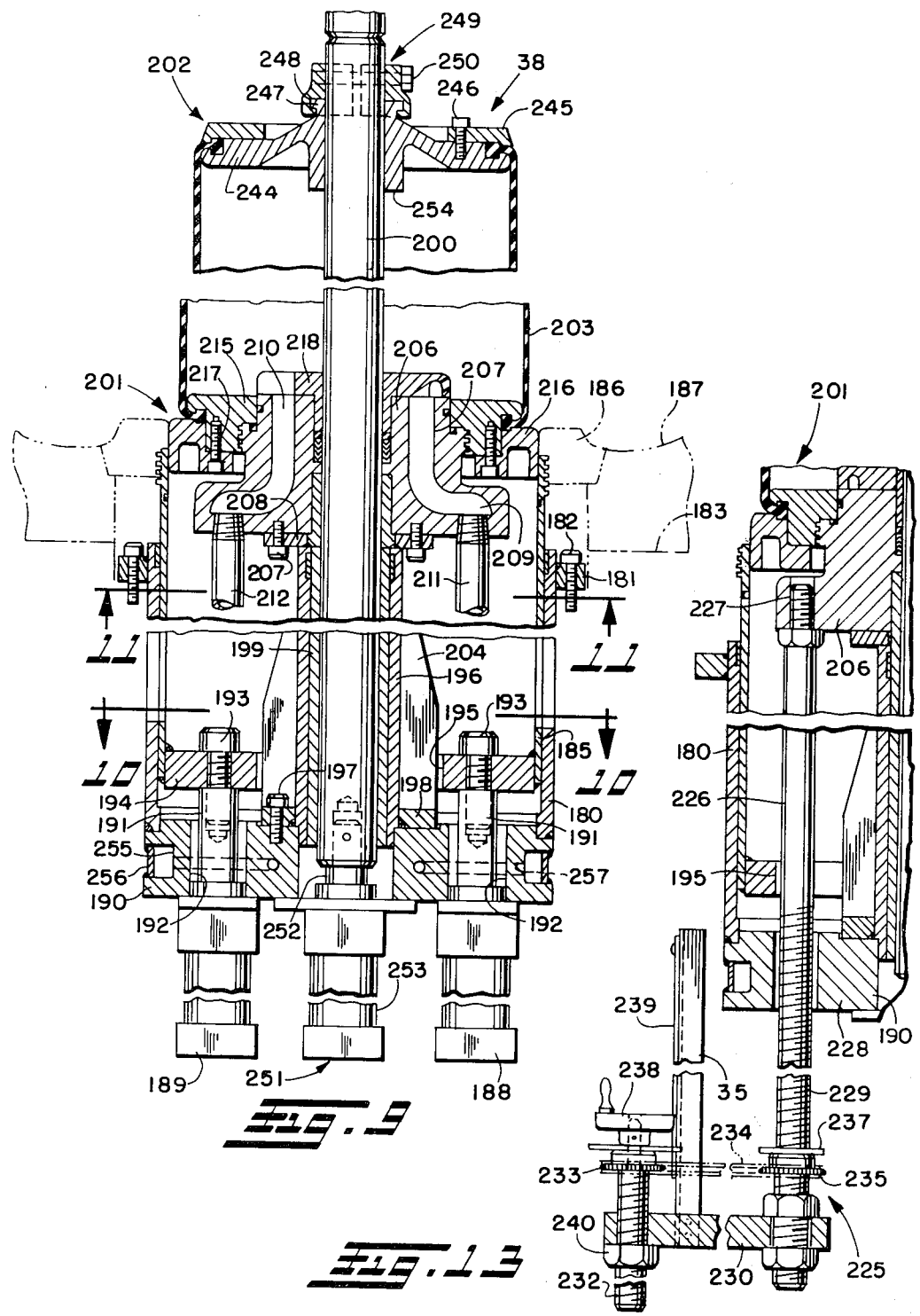

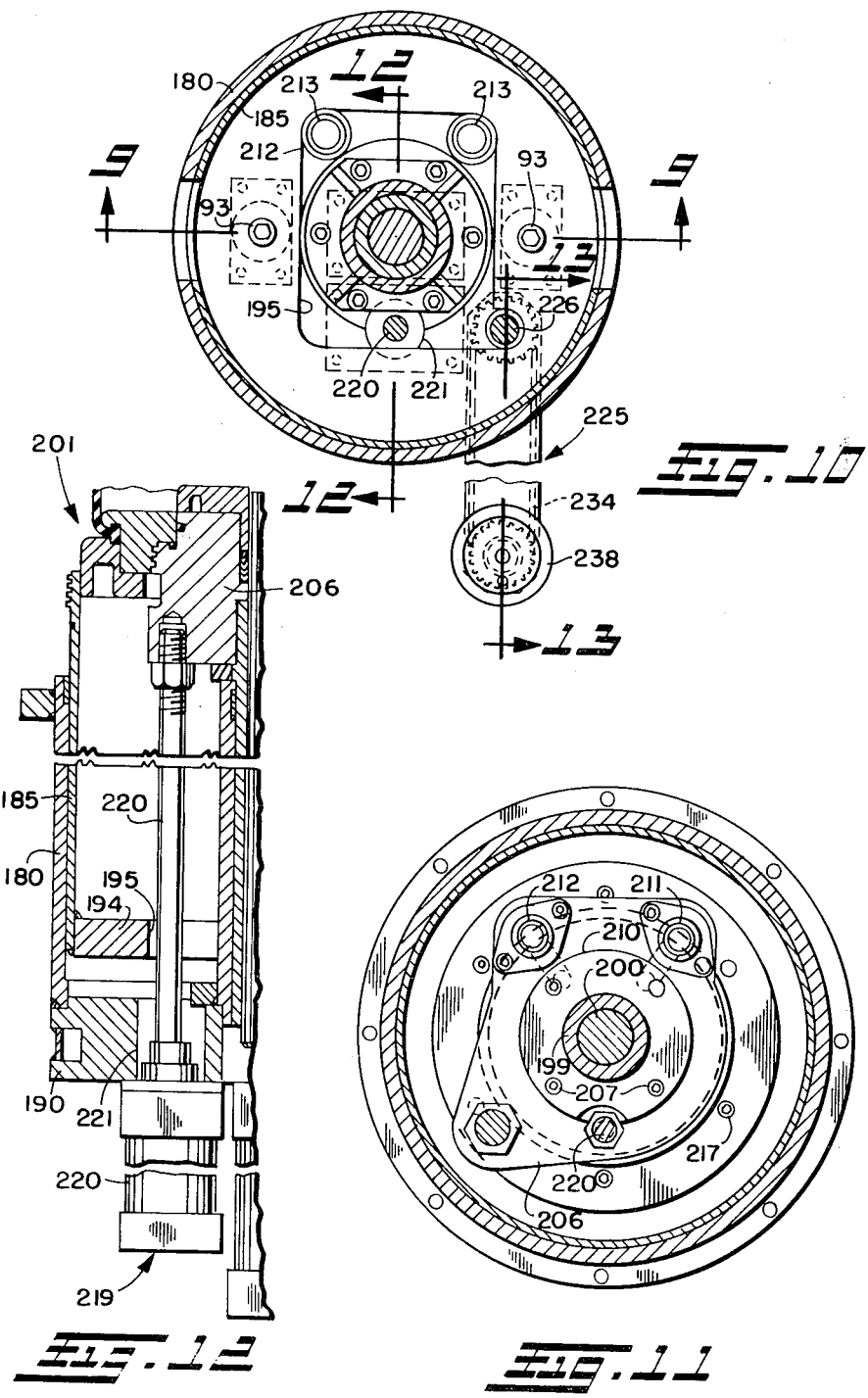

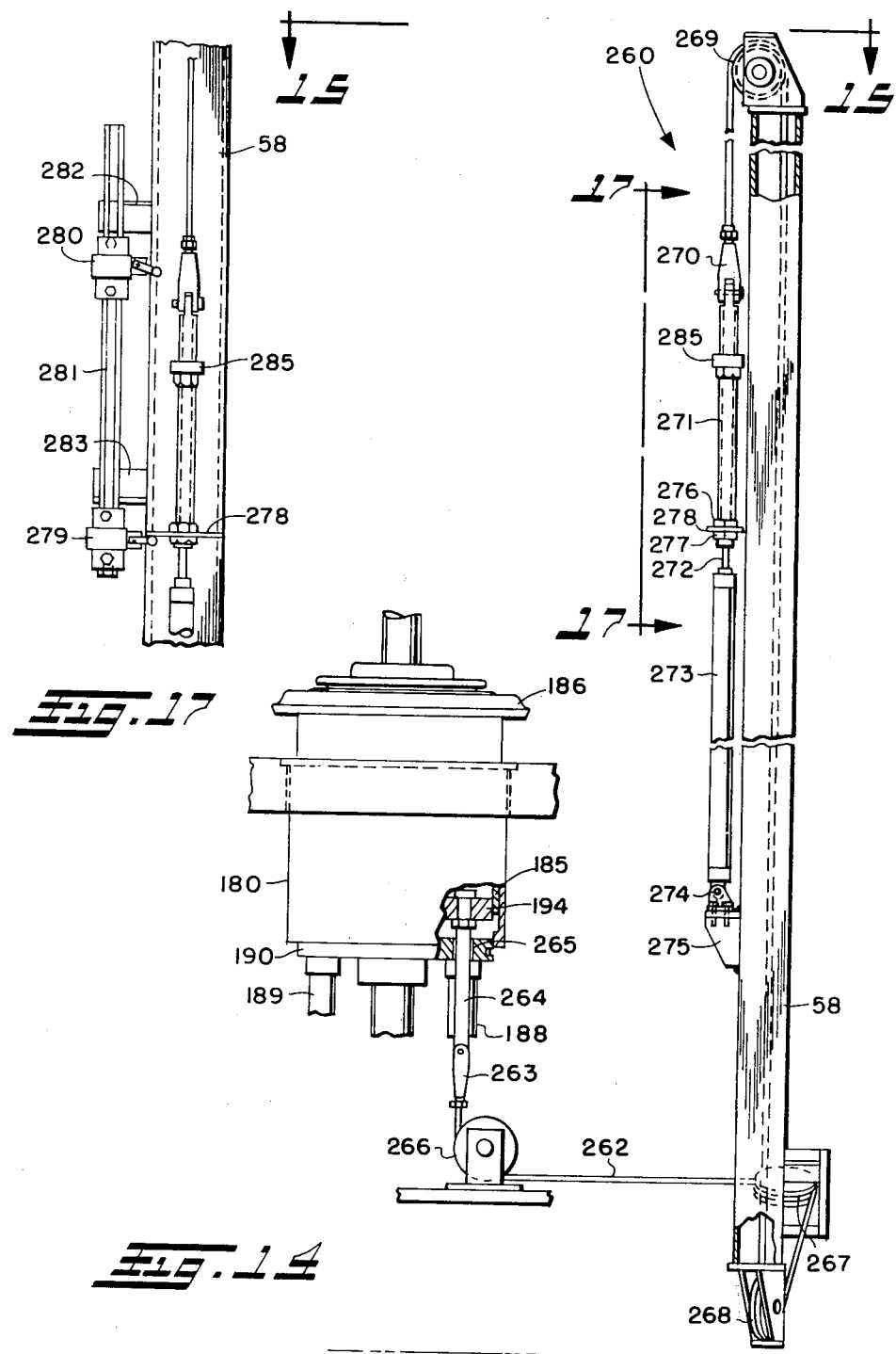

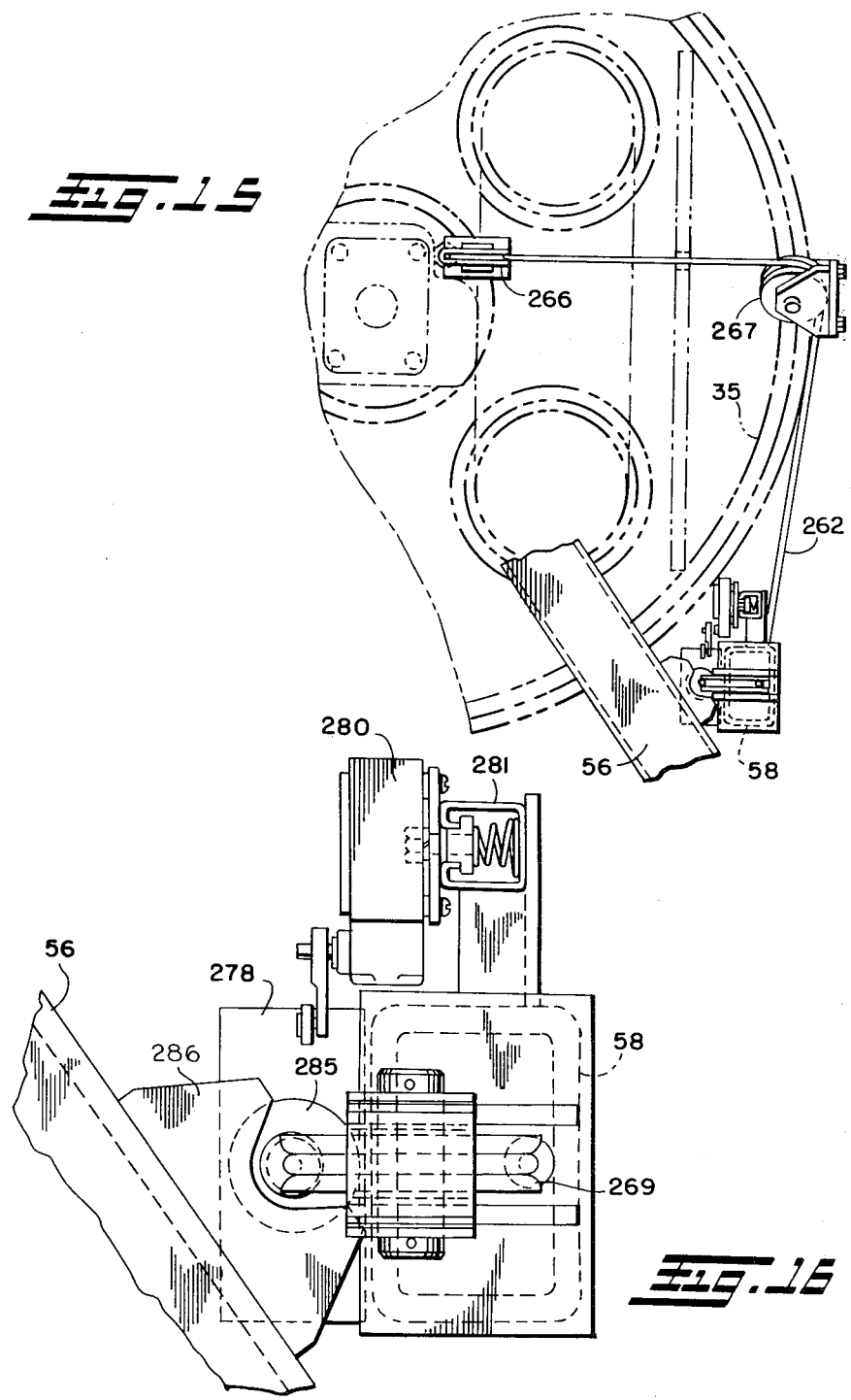

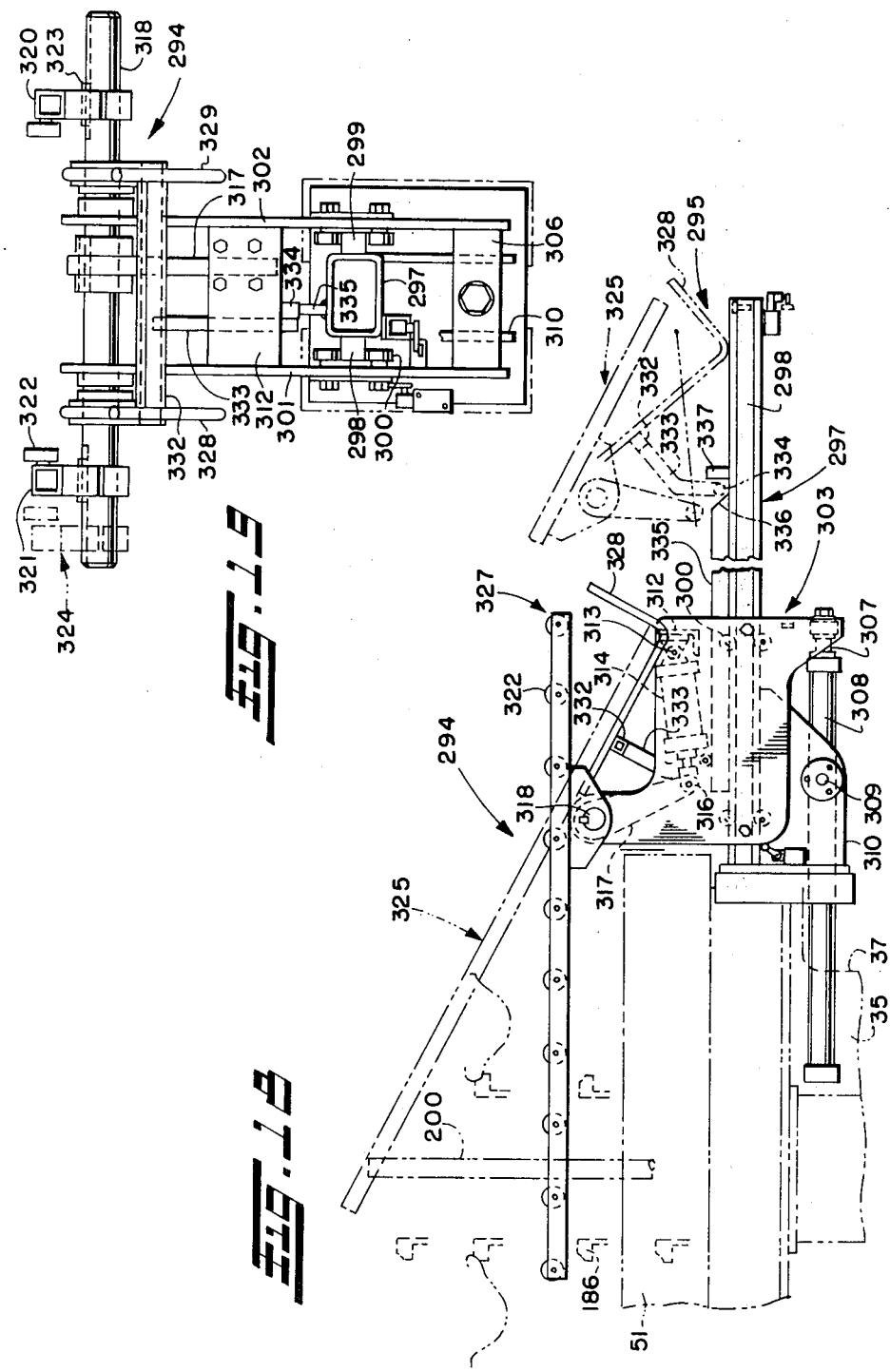

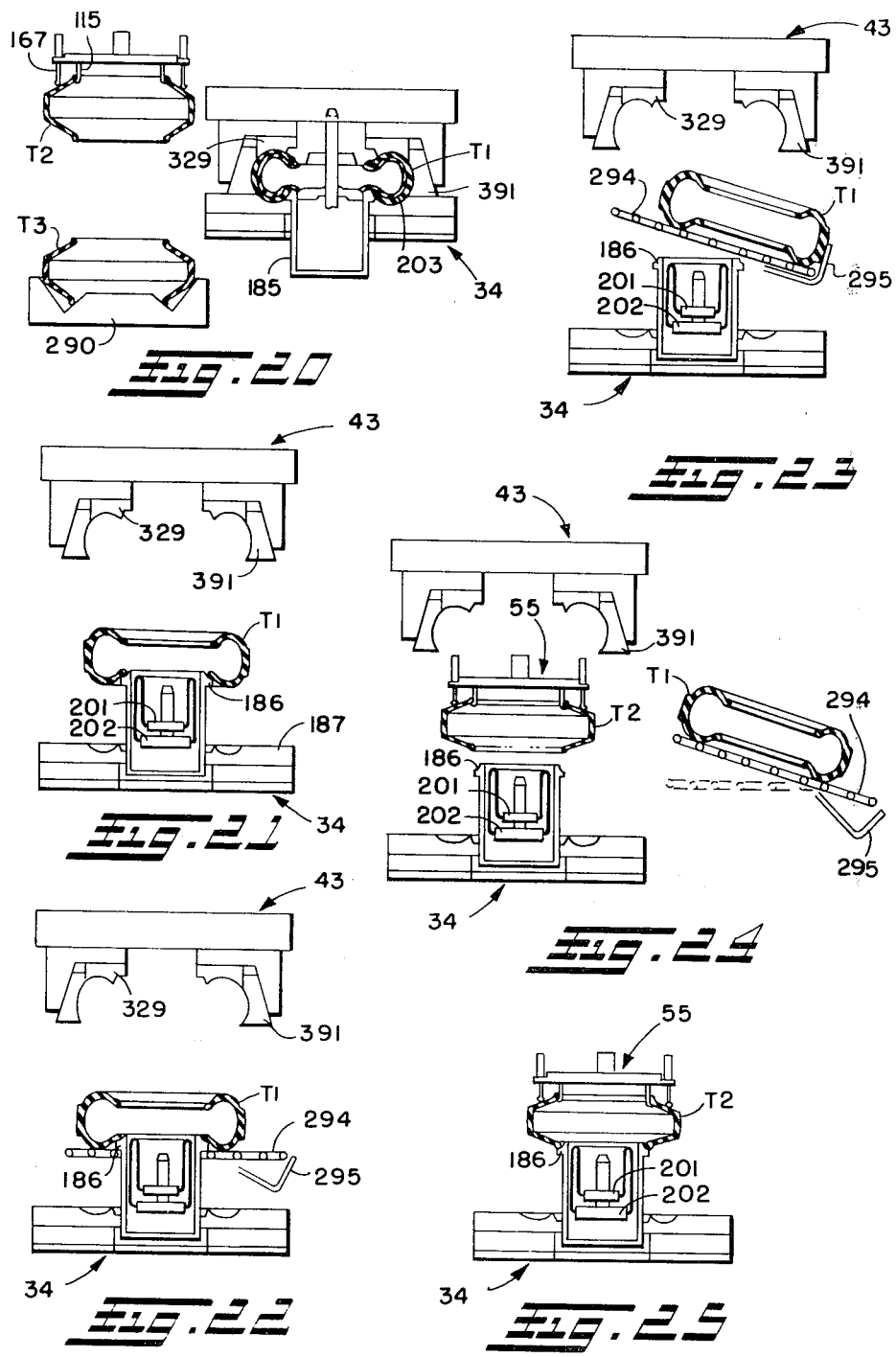

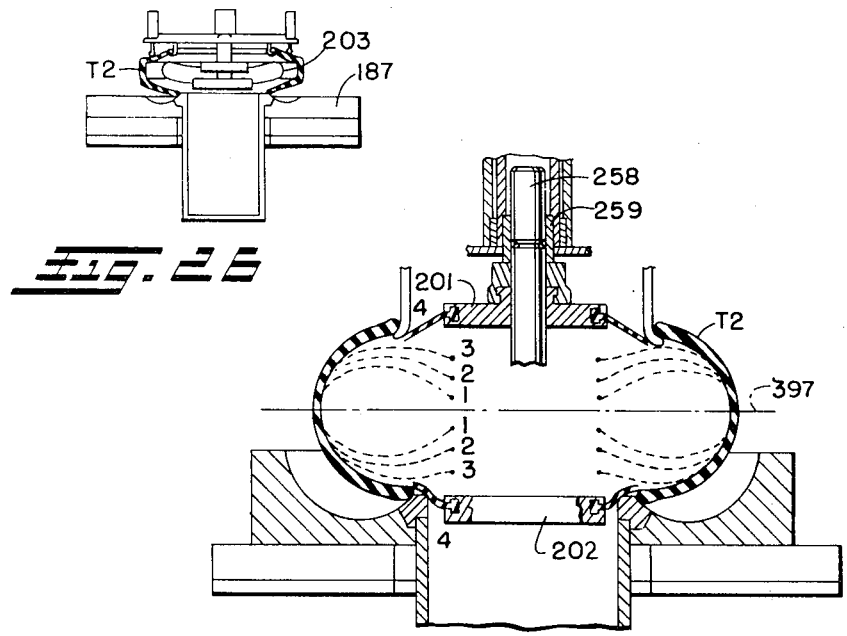
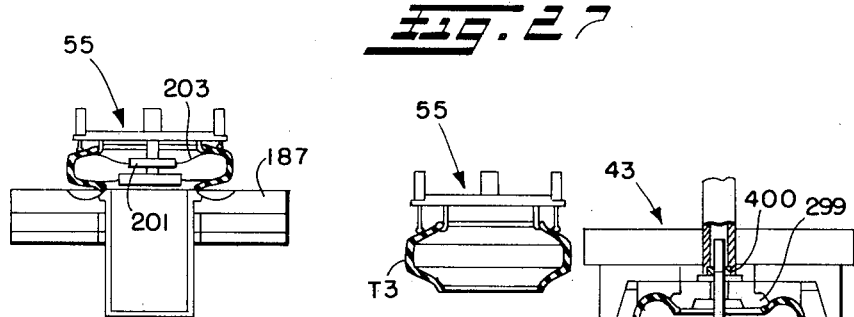
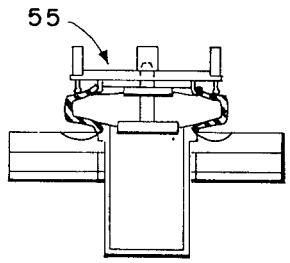
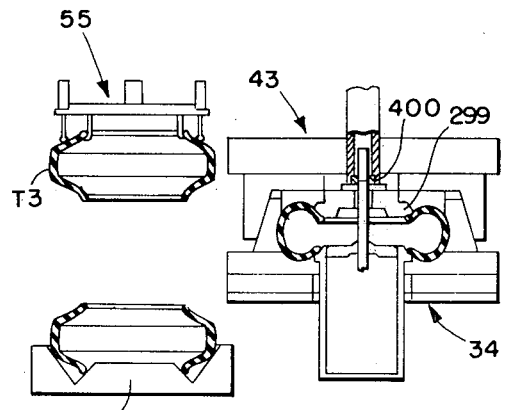

TIRE PRESS

BACKGROUND OF THE INVENTION

This is a division of application Ser. No. 255,733, filed Apr. 20, 1981 now U.S. Pat. No. 4,338,069, which is in turn a continuation-in-part of application Ser. No. 138,658, filed Apr. 9, 1980, now abandoned.

The present invention relates in general to a tire press and methods for shaping and curing tires, and more particularly to presses and methods utilizing shaping and curing bladders, and still more particularly to presses and methods utilizing automatic loader assemblies for introducing green tires into the press and the curing bladder into the tire. The invention further is concerned with the loading, shaping and curing of large preshaped tires such as radial ply truck tires.

Most tire curing presses and methods today employ an inflatable bladder that is capable of being radially distended within the green tire in order to apply shaping pressure and curing heat against the interior surface of the green tire within a mold cavity in the press. Such bladders are commonly mounted in and manipulated by a press center mechanism usually housed within the lower press half or base. Since the bladders usually have an axial length substantially corresponding to the circumferential interior surface of the tire which length is considerably greater than the opening or mouth between the spaced beads of a preshaped green tire, known presses have employed various types of center mechanisms and techniques to insert the bladder into the preshaped green tire. More particularly, known presses have utilized, for example, standing bladder center mechanisms which insert or snake the bladder into the tire around the top bead. Others insert or snake the bladder around the bottom bead.

As an example, a press built by Leonh. Herbert of West Germany inserts the bladder in the green tire as the tire is lowered and positioned between the press loader and a vertically movable bottom toe ring of the press. In such press, the toe ring is mounted on a vertically movable well that is simultaneously lowered along with the tire loader by means of a rack and pinion arrangement. During the loading operation, the bottom toe ring and well are raised to an elevated position. Also, a movable top bladder clamp for the bladder is lowered onto or adjacent a bottom bladder clamp which is fixed in the bottom press half essentially in horizontal alignment with the bottom toe ring when the latter is lowered and seated in the bottom mold part of the press. With the well raised and the top bladder clamp lowered, the bladder is contained with the well. The loader, holding the green tire by its upper bead, then places the tire on the elevated toe ring; and the loader and toe ring, with the tire positioned therebetween, are lowered simultaneously. At the same time, the top bladder clamp is elevated the maximum extent possible as it is inflated snaking into the tire over the descending bottom toe ring.

The aforementioned techniques however tend to asymmetrically stretch the bladder during its useful life causing variations, although slight, in tire quality over the life of the bladder. Such techniques also contribute to more frequent bladder replacement. Also, presses employing such center mechanisms usually may operate in accordance with only one of the bladder insertion techniques and accordingly a different press or center mechanism would be required if a different mode of bladder insertion is desired by the manufacturer.

Although any one bladder insertion technique may prove advantageous in a particular application, a symmetrical insertion technique from the mid-point of the tire is particularly desirable and advantageous. According to such technique, the green tire is centered to the bladder, or vice versa, and the bladder inflated therein with the bladder first contacting the green tire along its transaxial plane of vertical symmetry and then progressively symmetrically inflated outwardly from such plane toward the green tire beads to preclude air entrapment between the bladder and the green tire and to ensure that inflation of the bladder itself will not induce irregular asymmetrical molding stresses in the tire otherwise resulting from bladder shifting or stretching movements within the tire. It has also been found that such bladder insertion techniques will add to the life of the bladder as the bladder itself will be free of internal asymmetrical stresses during bladder inflation.

Heretofore, a problem in achieving such symmetrical bladder insertion has been the inability to load automatically and repeatedly the green tires in the press with assurance that the green tire center or crown is properly located in the press before and during bladder insertion. The problem at least partly stems from the fact that the sidewalls of preshaped green tires may be quite flexible and may also be dimensionally distorted in storage while awaiting cure. Since many if not most automatic loaders used today pick up the green tire by its upper bead, there is no assurance that the transaxial middle plane of the green tire is in a known or given location relative to the bladder before and during insertion. Moreover, the green tire may be pushed off center by the bladder as the bladder is inserted into the tire. As a result, there is a likelihood of asymmetrical positioning of the bladder in relation to the tire.

Several attempts have been made to achieve tire and bladder matching during loading of the tire in the press. One attempt is illustrated in Getz U.S. Pat. No. 3,790,656 wherein the press center mechanism includes a somewhat complicated linkage assembly for mechanically radially outwardly urging the bladder into contact with the green tire tread at locations intercepted by its plane of structural symmetry. Any asymmetrical positioning of the green tire in relation to the linkage assembly and bladder may result in improper seating of the beads of the green tire on their respective seats as the press closes since the bladder which supports the green tire during press closure may hold it misaligned with the bead seats.

Another attempt to achieve centered bladder insertion is shown in Gazuit U.S. Pat. No. 3,837,770. However, prior to bladder inflation and manipulation, the tire is supported at its top and bottom beads by the respective bead seats of the mold in the then essentially closed press. Such patent is silent as to how a green tire can be automatically picked up and located in the press with assurance that the green tire is properly positioned in the press before and during bladder insertion and before substantial closing.

Another problem in known presses employing inflatable bladders is that damage to the bead area of the tire may result during insertion of the bladder into the preshaped green tire. In snaking the bladder into the tire, the bladder may roll over one of the beads which rolling action may distort or cause damage to the bead leading to a defective tire. Still other drawbacks in known presses include difficulty in adjusting the press and loader assembly for shaping and curing different sizes of tires, difficulty in replacing the bladders when required, the requirement of vacuum systems to withdraw the bladder from the tire, and the use of expensive standing post assemblies and actuators therefor requiring special seals and/or packing capable of withstanding the high temperatures generated in the press. Moreover, the inability to achieve precise crown positioning of the tire with respect to the center mechanism and to the loader assembly and press mold parts, particularly before bladder insertion and closing of the press, has made the techniques of the present invention difficult to obtain. It has also been difficult to service the center mechanisms in many presses since to do so often required substantial disassembly of the center mechanism before it could be removed from the press.

With respect to the difficulty in adjusting the loader for different sizes of tires, it would be desirable to provide an adjustable mechanical stop assembly that is hand adjustable without the use of tools, and that is readily accessible so that the operator or servicer does not have to assume awkward and difficult positions to adjust the loader. An example of a simple and heretofore desirable adjustable mechanical stop employed as a stroke limiter in a tire loader is shown and described in co-pending application Ser. No. 095,586 for "Tire Loader" filed Nov. 19, 1979. It would be desirable to provide an improved adjustable mechanical stop for the therein disclosed tire loader and similar tire loaders.

SUMMARY OF THE INVENTION

With the foregoing in mind, it is a principal object of this invention to provide a tire curing press which achieves true symmetrical insertion of the bladder into a green tire from the center of the crown to improve tire uniformity and increase bladder life.

It is also an important object to provide such insertion while the tire is held by the loader.

It is another principal object of the invention to provide a tire press which offers bladder insertion mode flexibility.

It is still another principal object of the invention to provide a tire press which firmly holds the green tire during bladder insertion and precludes damage to the bead of the green tire during bladder insertion.

It is a further important object of the invention to provide a tire curing press in which the green tire is held open to facilitate bladder insertion.

Yet another important object is to provide such bladder insertion while the loader holds and identifies the upper bead and tread mid-plane while a vertically movable toe ring holds and identifies the bottom bead.

Still another important object is the provision of a loader and press wherein the green tire is firmly held or stabilized against lateral displacement as the shaping and curing bladder is inserted into the tire.

A related important object is the provision of a press wherein the loader and bottom toe ring may move vertically together.

Other objects of the invention are to provide a press which does not require a vacuum system to withdraw the bladder, to provide a press of reduced height, to provide for easy bladder change in the press, to provide a press which can employ standard actuating cylinders in the center mechanism, to provide a press which can be easily and readily adjusted for different sizes of tires, to provide a press center mechanism wherein the actuators are remotely located from the bladder to preclude water or other media contamination of the curing fluid in the bladder, to provide a press which gently removes the cured tire from the mold sections, and to provide a press wherein maintenance is greatly facilitated.

A further object of the invention is to provide a loader for use in a press which precisely identifies and locates the green tire axis and tread transaxial mid-plane.

A still further object of the invention is to provide a press wherein the center mechanism thereof can be precisely centered to a loader during loading of the green tire and bladder insertion and then precisely centered to the mold parts during press closing for precise locating of the tire in the mold, and wherein such precise centering is achieved by utilizing mechanical stops or other positioning devices.

Another object is the provision of a simplified unloader for a press utilizing the center mechanism of the present invention.

Still another object of the invention is to provide an adjustable mechanical stop for use in adjusting tire loaders to accommodate different sizes of tires, which stop is hand adjustable and readily accessible for ease in adjustment.

To the achievement of the foregoing objects and other objects of the invention, a tire press embodying the principles of the invention, in general, comprises a bead grip for engaging the upper bead of a green tire and a tread positioning device or register adapted to engage the upper shoulder of the tread to force a predetermined distance between the upper bead and tread to identify positively the transaxial plane of symmetry of the tread in the press. In addition, the tread register acts as a tire stabilizer which firmly holds the tire against lateral deflection as the press shaping and curing bladder is inserted into the green tire. The tread register includes a concentric ring mounted for axial movement by one or more piston-cylinder assemblies in turn mounted on alternate radial side bars of the bead grip which also support for radial sliding movement therealong respective loader shoes adapted to engage and lift the upper bead of the green tire when radially expanded and to disengage the bead when radially retracted. On the other alternate slide bars are mounted one or more adjustable mechanical stops for precisely determining such predetermined distance.

The bead grip and tread register preferably are carried by a loader for the press which includes means to move the bead grip and tread register from a tire pickup position in front of the press to a load position centered in the press when open and to position the lower bead of the green tire on or close to a vertically movable toe ring, and then to lower the bead grip, tread register and bottom toe ring uniformly with the green tire held firmly therebetween to seat the bottom toe ring in the bottom mold part of the press and to match the transaxial mid-plane of the tread to that of a bladder mounted in a center mechanism in the bottom press half between independently movable top and bottom bladder bead clamps. The top bead clamp is mounted on an axially movable center post which has an upwardly projecting pilot thereon receivable in a pilot bushing in the bead grip to match precisely the respective axes of the center mechanism and bead grip, and thus those of the bladder and green tire. With the green tire stabilized and held open by the bead grip and tread register and centered axially and transaxially to the bladder, the bladder is inflated first to contact the interior of the tread along the medial plane thereof and then progressively symmetrically outwardly from such plane toward the tire beads to achieve true symmetrical progressive bladder insertion. The green tire being held by the center mechanism and bottom toe ring, the top mold half is lowered to close the press and includes therein a pilot bushing for receipt of the center post pilot to match the respective axes of the center mechanism and top mold half for proper seating of the green tire in the top mold part as the press closes.

Further in accordance with the invention, the bottom bladder bead clamp is mounted on a sleeve on the center post and the sleeve and center post are mounted for vertical telescoping movement in a mounting well removably secured in the bottom press half. The mounting well further supports therein for vertical telescoping movement a movable sleeve to which is secured the bottom toe ring. Actuation of the bladder bead clamps and movable well is obtained by hydraulic actuators mounted on the bottom plate of the mounting well which bottom plate includes passages for circulation of coolant to isolate the hydraulic actuators from the heat generated during the curing operation. The center mechanism components are all carried by the mounting well for easy removal as a unit for maintenance or repair.

The invention further contemplates preferred constructions of the tire press and components thereof including the loader and unloader therefor and various adjustable mechanical stops and positioning devices provided for precisely locating the movable press components with respect to one another, all of which are more fully described in the following detailed description.

To the accomplishment of the foregoing and related ends the invention, then, comprises the features hereinafter full described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 2 is a fragmentary enlarged side elevation partially broken away and in section of the loader assembly;

FIG. 3 is an enlarged partial horizontal section through the loader assembly of FIG. 2 taken substantially on the line 3—3 thereof;

FIG. 4 is a partial top view of the loader assembly of FIG. 2 as seen from the line 4—4 thereof;

FIG. 5 is an enlarged vertical section through the bead grip assembly and tread register assembly of the loader assembly taken substantially on the line 5—5 of FIG. 6;

FIG. 6 is a fragmentary top view of the bead grip assembly and tread register assembly as seen from the line 6—6 of FIG. 5;

FIG. 6A is a partial vertical section through the stroke limiting assembly of the loader assembly taken substantially on the line 6A—6A of FIG. 6;

FIG. 7 is a fragmentary side view of the bead grip assembly as seen from the line 7—7 of FIG. 6;

FIG. 8 is a partial side view of the bead grip assembly as seen from the line 8—8 of FIG. 6 showing in particular the tire detect assembly thereof;

FIG. 9 is a fragmentary vertical section through the center mechanism of the tire press taken substantially on the line 9—9 of FIG. 10;

FIG. 10 is a horizontal section through the center mechanism taken substantially on the line 10—10 of FIG. 9;

FIG. 11 is another horizontal section through the center mechanism taken substantially on the line 11—11 of FIG. 9;

FIG. 12 is a partial fragmentary vertical section through the center mechanism taken substantially on the line 12—12 of FIG. 10 showing in particular the bottom bead clamp assembly and actuator therefor;

FIG. 13 is a partial fragmentary vertical section through the center mechanism taken substantially on the line 13—13 of FIG. 10 showing in particular the adjustable movable stop for the bottom bead clamp assembly;

FIG. 14 is a fragmentary front elevation of the tire press with portions thereof removed to illustrate the bottom toe ring loader driven lowering assembly;

FIG. 15 is a partial fragmentary top view of the assembly of FIG. 14 as seen from the line 15—15 thereof;

FIG. 16 is an enlarged view of a portion of FIG. 15;

FIG. 17 is a partial fragmentary side view of the assembly of FIG. 14 as seen from the line 17—17 thereof;

FIG. 18 is a side elevation of an unloader which may be used with the press and center mechanism of the present invention;

FIG. 19 is an enlarged end elevation of the unloader as seen from the line 19—19 of FIG. 18; and FIGS. 20-30 are schematic illustrations depicting a preferred press operational cycle.

DETAILED DESCRIPTION OF THE DRAWINGS

I. General Description of the Press

Figure 1:
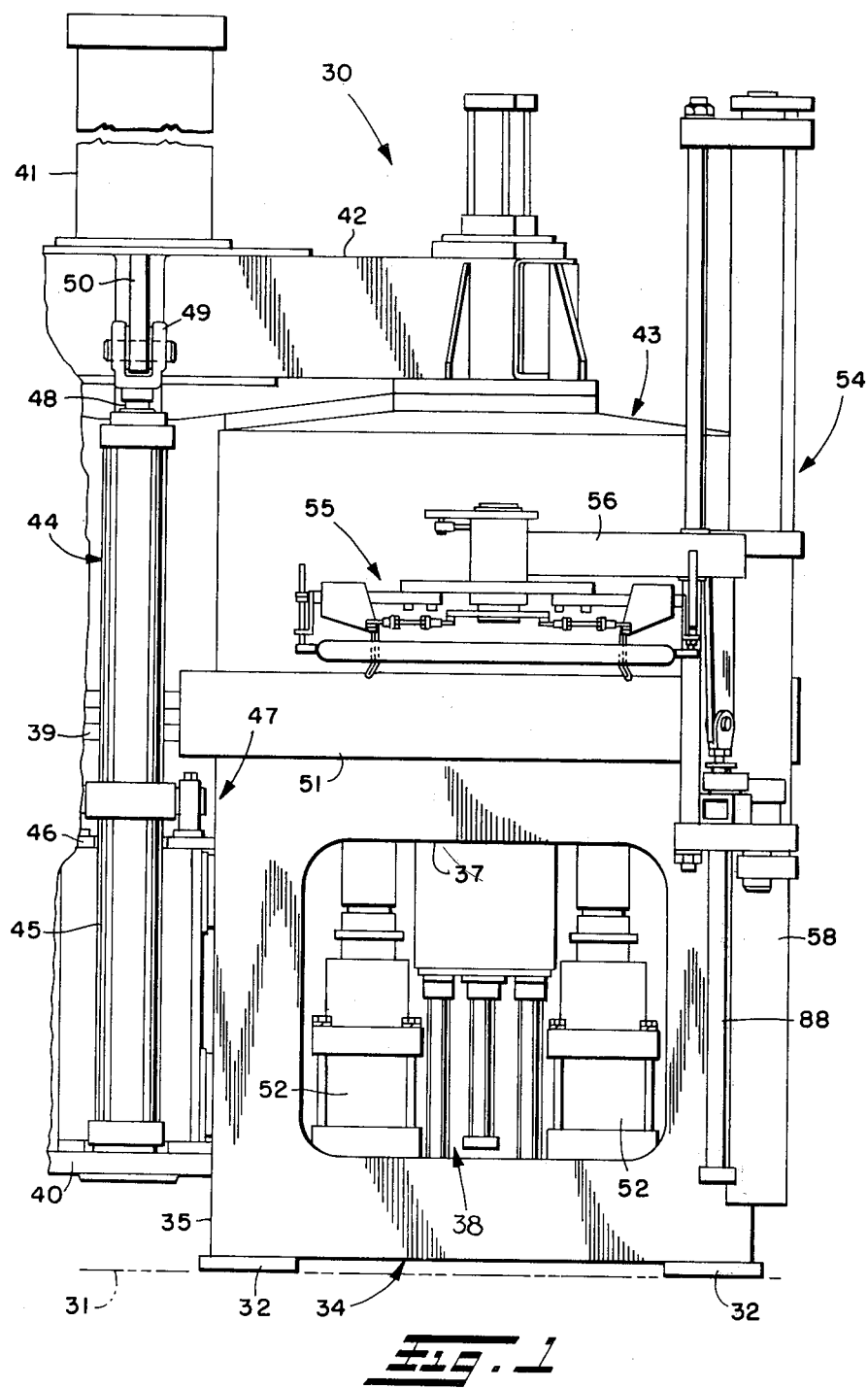
FIG. 1 is a fragmentary front elevation of one side of a dual cavity tire curing press constructed in accordance with the present invention with a loader assembly for the press cavity illustrated at the right.

Referring first to FIG. 1, there is shown generally at 30 the righthand side of a dual cavity tire curing press particularly suited for shaping and curing large tires such as truck tires. The press 30 is mounted on the floor 31 by footers 32 secured to the underside of the bottom press half 34. The bottom press half 34 includes a fabricated frame consisting of side plates and horizontal frame members which are hidden from view by a cylindrical annular plate 35 which shields the press components of the bottom press half 34. The annular plate 35 has in its front and rear sides an access opening 37 through which access may be had to the internal press components in the bottom press half 34 such as a center post assembly or mechanism 38 which is described hereinafter in greater detail.

Secured between the annular plates 35 of the bottom press halves 34 for each cavity (to the left in FIG. 1) are vertically spaced, horizontal brackets 39 and 40 which together support a vertical column 41. Mounted on the vertical column 41 for guided sliding vertical movement is a horizontal beam or yoke 42 which projects over the respective mold cavities and from which depend at its distal ends the top press mold halves 43. A long stroke piston-cylinder assembly 44 is also positioned between the press cavities forwardly of the vertical column 41 with its cylinder end 45 centrally mounted on frame bracket 46 by trunnion assembly 47 and its rod end 48 connected by clevis 49 to the horizontal beam 42 at horizontal beam projection 50 which extends forwardly from the horizontal beam 42.

Actuation of the piston-cylinder assembly 44 effects vertical movement of the horizontal beam 42 along the vertical column 41 and accordingly vertically moves the top mold press half 43 to open and close the press. When the press is closed, a lock ring 51 is rotated to lock the top press mold half 43 to the bottom press half 34. Hydraulic squeeze cylinders 52 may then be actuated to close and preload the mold parts carried in the mold halves in a manner more fully described and shown in applicants' copending application entitled "Hydraulic Tire Press", filed Apr. 9, 1980 and assigned Ser. No. 138,589. Although the press shown and described is of a preferred type, it should however be appreciated that the principles of this invention may be used in other types of presses as well.

II. The Loader Assembly

Still referring to FIG. 1, the press 30 has a loader assembly 54 for loading a green tire into the press cavity shown from a pick-up position in front of the press. The press usually will have a second similar loader assembly for loading the other tire cavity of the press. As shown, the loader assembly is of the swing-arm type and includes a bead grip or chuck assembly 55 which depends from the distal end of a loader arm or frame 56 mounted on loader stanchion or column 58 for vertical and horizontal swinging movement as more fully described below. The loader stanchion 58 may be independently mounted on the floor or conveniently mounted on the side of the bottom press half 34 as shown.

Referring now to FIGS. 2-4, the loader arm 56 is mounted at the top of a vertically extending square tube 60 which interconnects vertically spaced side blocks 61 and 62 mounted for vertical sliding movement on a pivot shaft 64 which is journaled top and bottom between brackets 65 and 66 on the stanchion 58. Keyed to the pivot shaft 64 for common pivotal movement are top and bottom pivot plates 69 and 70, respectively. The pivot plates are generally rectangular in shape and retain between their projecting ends a guide rod 71 spaced from and parallel to the pivot shaft 64. The guide rod 71 extends through a bushing 72 in the loader arm 56 and causes the loader arm to pivot commonly with the pivot shaft 64 and pivot plates 69 and 70.

As best seen in FIG. 3, the end of the bottom pivot plate 70 opposite the guide rod 71 has a chamfered corner 74 from which a lug 75 extends and to which is secured by clevis 76 the rod end of a horizontal piston-cylinder assembly 77. The blind end of the piston-cylinder assembly 77 is connected at pivot 78 to mounting bracket 79 which is secured to the annular plate 35 of the bottom press half. It can be seen in FIG. 3 that bracket 79 is one of the mounts by which the loader stanchion 58 is secured to the bottom press half, the stanchion having a vertical mounting plate 80 secured by fasteners 81 to a vertical flange plate 82 of the bracket 79.

When the piston-cylinder assembly 77 is retracted, it rotates the pivot plates 69 and 70 to the respective positions shown in full lines in FIGS. 3 and 4, respectively, which causes the loader arm 56 to swing the bead grip assembly 55 into alignment with a green tire pick-up position in front of the press. The piston-cylinder assembly is extended to rotate the pivot plates in the opposite direction to the position shown in phantom lines which causes the loader arm to swing the bead grip assembly to a load position in the open press. Extension of the rod is limited by an adjustable stop 83 at the projecting end of the bottom plate 70 which abuts a stop plate 84 on the stanchion 58 as seen in the phantom line position. The stop is adjusted to assure that the axial centerline of the bead grip assembly 55 is within a close tolerance of the press axial centerline when in the load position. As best seen in FIG. 4, limit switches 85 and 86 mounted on the top bracket 65 which engage a pin 87 extending vertically upwardly from the top pivot plate 69 are provided to indicate when the loader arm is in the load or pick-up position.

Vertical movement of the loader arm 56 is effected by a vertical piston-cylinder assembly 88 which has its cylinder mounted by trunnion 89 on the bottom pivot plate 70. The rod end of the piston-cylinder assembly 88 is connected by clevis 90 to a gusset 91 secured to the underside of the loader arm 56 and one side of square tube 60. Extension of the piston-cylinder assembly 88 will move the loader arm 56 to the phantom line position 92 shown in FIG. 2 while retraction will return it to the position shown in solid lines. A pair of limit switches 93 and 94 are provided to indicate the raised and lowered positions of the loader arm 56. The upper limit switch 93 is mounted on a bracket 95 depending from the top pivot plate 69 and will be tripped by engagement with cam plate 96 secured to square tube 60. The lower limit switch 94 is mounted on a vertical extension 97 on the bottom pivot plate 70 and will be tripped by engagement with adjustable cam plate 98 which is adjustably slidably secured in a vertical track 99 on the square tube 60.

A. Bead Grip Assembly

Referring now to FIGS. 5-8, it will be seen that the bead grip assembly 55 includes a vertically projecting hub 100 secured to the distal end of the loader arm 56. The top and bottom ends of the hub 100 project beyond the loader arm and have therein flanged bushings 102 through which vertically extending tubular pin 103 extends. Keyed to the tubular pin 103 at its top end which projects beyond the hub 100 is a horizontal drive plate or crank 104 which includes two oppositely extending radial arms 105 and 106 of equal length. The bottom end of the tubular pin 103 projects below the hub 100 and has keyed thereto a circular plate 107. The drive plate 104 and circular plate 107 are held in place on the tubular pin 103 by snap rings or retainers 108 and 109 and cooperate to retain the tubular pin 103 in the hub 100.

The lower end of the hub 100 beneath the loader arm 56 has secured thereto a flange forming ring 110 which is positioned above and extends radially outwardly beyond the circular plate 107. Secured to the underside of the ring flange 110 by the fasteners 111 are six equally circumferentially spaced radially extending horizontal slide bars 112. For each slide bar 112 there is provided a loader shoe 113, each of which is identical in form and accordingly only one will be described in detail.

Each loader shoe 113 is formed from relatively thin gauge metal and includes a vertically extending spine plate 114 which is slightly curved as seen in FIG. 6. At its bottom, the spine plate 114 is bent outwardly slightly to form a lip 115 adapted to engage the upper bead of a tire T. The curvature of the spine plate is determined by the range of tire sizes which may be accommodated by the loader. The top of the spine plate is welded to a cross bar 116 connecting parallel side plates 117. The side plates 117 are also interconnected by four nut and bolt fasteners 119, the shanks of which pass through compression sleeves or spacers 120. Such spacers 120 fit into semicircular grooves in the backs of self-aligning slide blocks 121 which include a shallow groove confining the slide bar 112. The slide blocks 121 are arranged in pairs on opposite sides of the slide bar 112 to hold the loader side plates in place on the slide bar for radially sliding movement therealong.

Each loader shoe 113 is connected to the circular plate 107 by a connecting rod or link 123. Each connecting rod 123 includes at each end eyes 124 and 125 threadedly connected to the shank 126 which are in turn hingedly connected at 127 and 128 to the top of cross bar 116 and the bottom of circular plate 107, respectively. The effective length of each rod may be adjusted by rotating the shank 126 with respect to the eyes 124 and 125, when their respective lock nuts 130 and 131 are loosened.

In FIG. 6, the shoes 113 are illustrated at their maximum diameter with the connecting rods 123 extending generally radially. Upon rotation of the circular plate 107 in a clockwise direction as seen in FIG. 6, the connecting rods 123 move uniformly at a common angle with respect to a radius from the tubular pin 103 radially to retract the shoes 113 along the slide bars 112 to a minimum diameter.

The circular plate 107 is oscillated by means of a pneumatic piston-cylinder assembly 133, the rod thereof being provided with a clevis 134 pivotally connected at 135 to the arm 105 of drive plate 104. The blind end of the piston-cylinder assembly 133 is pivotally connected at 136 to a bracket 137 provided on the loader arm 56. Retraction of the assembly 133 will radially retract the loader shoes 113 while conversely, extension of the assembly will radially expand the loader shoes 113. Reference may be had to the co-pending application of Anand P. Singh, Ser. No. 095,586, filed Nov. 19, 1979, entitled "Tire Loader", for a more detailed disclosure of a similarly constructed tire loading chuck.

The stroke of the piston-cylinder assembly 133 is limited in both directions by a stroke limiting assembly generally shown at 138 in FIG. 6 which comprises a threaded stroke limiter rod 139 pivotally connected at 140 to the arm 106. An internally threaded adjustment sleeve 141 provided on the rod 139 extends through an oversize opening 142 in a stop block or bracket 143 fixedly secured to the loader arm 56 and interconnects stop collars 144a and 144b on each side of the stop bracket 143. The stop collar 144a preferably is fixedly secured or integrally formed with the sleeve 141 whereas the stop collar 144b is internally threaded so that it may be adjustably positioned on the externally threaded end of the sleeve. Once adjusted, the stop collar 144b may be locked on the sleeve by means of a set screw. In this manner, the maximum travel of the rod 139, which is determined by the respective engagement of the stop collars with the stop bracket, can be adjusted. Moreover, the sleeve 141 may be adjusted on the rod 139 to determine precisely the maximum permissible extension of the rod to determine a maximum diameter of the loader shoes for any size of tire.

Once adjusted, the position of the sleeve 141 on the rod 130 may be releasably locked by means of a detent pin 145 which is removably received in aligned holes 146a and 146b in the collars 144a and 144b, respectively. In addition, the pin passes through the oversize opening 142 in the stop bracket 143 and will engage the walls of such opening to preclude rotation of the sleeve on the rod. As seen in FIG. 6A, the opening 142 is pear-shape with its large and small ends accommodating the sleeve and pin, respectively. The opening 142 also is sufficiently oversized in its lateral or horizontal dimension so that the adjustment rod and pin are free to move laterally in the oversize opening to ensure full face mating contact between the collar 144a and stop bracket 143 throughout the intended adjustment range, and preferably between the collar 144b and bracket 143 as well.

Preferably there are two or more circumferentially equally spaced holes 146a and 146b in the collars 144a and 144b for fine adjustment of the adjustment sleeve 141 on the rod 139. As shown, two diametrically opposed holes are provided in each collar so that the sleeve can be adjusted by one half turns on the rod and then locked by the detent pin 145, which should be adequate for most purposes. In addition, the pin preferably is of the single acting ball lock type which has retractable ball bearing detents at its end adjacent the collar 144a that, when radially extended, prevent their passage through the hole 146a in the collar 144a thereby to lock the pin in place. To unlock the pin, a button at the opposite end of the pin is depressed to radially retract the ball bearings to permit removal of the pin. Such pin may also be provided with a ring at its button end to facilitate handling and a strap that may be connected for example to the end of the rod 139 to prevent the pin from being lost or dropped. Pins of the aforedescribed type are manufactured and sold by the Carr Lane Mfg. Co., St. Louis, Mo.

It should be appreciated that the stroke limiter assembly 138 easily can be adjusted by hand without wrenches or other tools for use with different sizes of tires. Moreover, such adjustment can be made at a readily accessible location. The operator or servicer can easily reach and remove the detent pin 145 from the collars. The operator then can grasp and rotate the outermost stop collar 144b, and hence the adjustment sleeve 141. As seen in FIG. 6, the edge surface of the stop collar 144b is knurled to ensure a good grip. After the sleeve is properly positioned on the rod for the intended tire size, the stop collar 144b is rotated slightly, if necessary to align one of the bores therein with the small end of the oversize opening 142. This also aligns a corresponding bore in the other stop collar 144a with the small end of the opening 142 so that the detent pin can be inserted through the bores and opening thereby to lock the stroke limiter assembly in its new adjusted position.

As best seen in FIGS. 6 and 8, the bead grip assembly 55 further includes a tire detect assembly shown generally at 147. Such assembly comprises a vertically extending tubular guide 148 mounted at the projecting end of a radially extending platform 149 in turn mounted on the ring flange 110. Slidably movable in the guide sleeve 148 is a rod or tube 150 which has secured at its lower end a radially extending horizontal rod or tube 152. Adjustably secured at the top end of the tube 150 is a trip plate 153 which is also guided for vertical movement by guide 154. The rod 150 is adjusted in the trip plate 153 so that the lip 115 of the loader shoes 113 will be inside the green tire before the tube 152 engages the sidewall of the green tire. As the loader assembly is further lowered, the trip plate 153 will be urged vertically upwardly to actuate the switch 156 mounted on platform 149 to indicate that the loader is in proper position raltive to the green tire for expansion of the loader shoes as well as to indicate the presence of a green tire.

It can now be appreciated that the loader can be swung to the pick-up position in front of the press and lowered to position the retracted loader shoes within the upper end of a green tire supported for example on a stand in front of the press. After the loader shoes are radially expanded, the loader can be raised to cause the loader shoes to engage the axial interior of the upper bead of the green tire. As the shoes engage and lift the upper bead of the green tire, they will center the upper bead axially with respect to the bead grip assembly.

Although the upper bead of the green tire will be centered with respect to the bead grip assembly 55 when the loader shoes are extended and then raised to grip the axial interior of the upper bead of the green tire, the transaxial mid-plane of the tire tread cannot be precisely identified due to the flexible nature of the sidewalls of the uncured tires. The problem is particularly aggravated since the tires are often stored on their sides which may lead to distortion of the sidewalls such that the tread transaxial plane of symmetry will be askew to the upper bead plane of the tire held by the loader shoes. To alleviate this problem, there is provided a tread register assembly which is indicated generally at 160 in FIG. 5.

B. The Tread Register Assembly

As seen in FIGS. 5 and 6, the tread register assembly 160 includes six L-shape mounting brackets 161 having short radially outwardly extending legs 162 and long vertically extending legs 163, the latter of which are secured at their upper end by fasteners 164, respectively, to the ends of the slide bars 112. Mounted on the short leg 162 of each alternate bracket is a vertically extending pneumatic piston-cylinder assembly 165, the rod of which extends downwardly from the bracket 161 and is connected at its lower end to a radially extending lug 166 on a tubular ring or tread positioner 167, such ring being coaxial with the bead grip assembly 55. Mounted on each other alternate bracket is an adjustable ring stop 168 which together limit the downward stroke of the piston-cylinder assemblies 165 and thus the downward movement of the tread ring 167. Each stop 168 comprises a threaded vertical rod 170 secured to radially projecting lugs 171 on the tread centering ring 167. The rod extends through an opening in the short leg 162 of the bracket and there is provided on the side of the bracket opposite the ring 167 an adjustable stop nut 172 and lock nut 173 therefor.

With the piston-cylinder assembly 165 retracted, the tread locating ring 167 is in an out-of-the-way position which permits insertion of the loader shoes into a green tire T for gripping the upper bead 174 thereof. With the green tire lifted and held by its upper bead as seen at the left in FIG. 5, extension of the piston-cylinder assemblies 165 moves the tread locating ring 167 downwardly to engage the upper shoulder of tread portion 175 of the green tire and to force a predetermined distance between the upper bead and tread portion as seen in phantom lines in FIG. 5 to eliminate any tire distortion and to identify precisely and positively the transverse tread plane of symmetry, such predetermined distance being precisely determined by engagement of the adjustment nut 174 with short leg 162 of bracket 161. In this manner, the transverse tread crown or center plane of symmetry can be precisely identified or located with respect to the bead grip assembly 55 which in turn can be swung into the press and precisely located therein relative to the press center mechanism 38 and mold parts. The ring 167 when extended also ensures that such plane and the plane of the top bead are parallel. The press bladder may then be manipulated and inserted by the center mechanism into the green tire for preshaping and cure.

It also can be appreciated that the tread register assembly 160 also functions as a tire stabilizer operative to restrict lateral movement of the green tire as the bladder is inserted into the tire. The green tire can be firmly held against lateral deflection so that it is not, for example, pushed off center by the press shaping and curing bladder as the bladder unfolds and inflates into the green tire.

III. The Center Post Assembly

Referring now to FIGS. 9-13 and particularly to FIG. 9, it will be seen that the center mechanism 38 is mounted centrally in the press by means of a mounting well 180 which has welded at its upper cylindrical end a flange ring 181 which is secured by fasteners 182 to the bottom press half at the bottom platen 183 thereof. It will be appreciated below that the other components of the center post assembly 38 are all carried in the mounting well and accordingly, removal of the fasteners 182 and disconnection of the required hydraulic connections will permit removal of the entire center mechanism as a unit for maintenance or repair purposes.

The mounting well 180 opens upwardly to the press mold cavity and has telescoped therein for vertical movement a movable well or sleeve 185 which has threaded thereon at its upper cylindrical end a bottom toe or bead ring 186. The bottom toe ring 186, which provides a seat for the lower bead of a tire to be processed in the press, may be easily removed and replaced on the threaded well with a different size toe ring for processing green tires of different dimensions.

The bottom bead ring 186 is selectively positioned seated in register with the lower mold part 185 as shown in FIG. 9 or extended thereabove by bead lift hydraulic actuators 188 and 189. The cylinders of the actuators are mounted on the bottom plate 190 of the mounting well with each cylinder extending downwardly from the underside of the bottom plate. The rod 191 of each assembly extends through an opening 192 in the bottom plate and is connected at its top end by fastener 193 to the bottom plate 194 of the movable well 185. As best seen in FIG. 10, the cylinders are located diametrically across from one another for balanced application of force to the movable well.

The bottom plate 194 of the movable well 185 has a central aperture 195 through which extends a vertical cylindrical post support member 196 which is mounted by fasteners 197 at an annular flange 198 centrally on the top surface of the bottom plate 190 of the mounting well. Retained in the post support for respective telescoping vertical movement are a post sleeve 199 and center post 200 on which are mounted, respectively, the bottom and top bead clamps 201 and 202 for a shaping bladder or bag 203. For added rigidity, the support 196 may be provided with radial fins or gussets 204 best seen in FIGS. 9 and 10.

The bottom bead clamp 201 includes a hub 206 which is secured by fasteners 207 to a ring flange 208 provided on the post sleeve 199 with the top of the post sleeve extending partially into a bore in the bottom of the hub. Ingress and egress of curing media to the interior of the bladder 203 is obtained through the hub 206 which is provided with passages, one passage 209 normally being an inlet and the other passage 210 a drain for suitable circulation of the curing media. The passages may be serviced respectively by inlet and outlet pipes 211 and 212 set in the lower ends of the passages which pipes extend through openings 213 in the bottom plates of the movable well and mounting well respectively, and are connected underneath the mounting well by suitable couplings to a source and drain for the curing media.

The hub 206 further includes a reduced diameter upper portion on which is threaded and sealed a top clamp ring 215 which cooperates with a bottom clamp ring 216 to secure therebetween the lower bead area of the bladder 203. The bottom clamp ring 216 is detachably secured to the upper clamp ring 215 by fasteners 217 for bladder change. The top of the hub 206 is provided with a retainer 218 for the packing gland illustrated.

In the position shown in FIG. 9, the bottom bead clamp 201 at the flange 208 rests on the top of the post support sleeve 196 to determine its lowermost position. In such position, the bottom bead clamp 201 is generally in horizontal alignment with the bottom toe ring 186 when the latter is in its retracted or registered position with the lower mold part 187.

For vertical actuation of the bottom bead clamp 201, it can be seen in FIG. 12 that there is provided a vertical piston-cylinder assembly 219 having its cylinder 220 mounted on and beneath the bottom plate 190 of the mounting well 180. The rod 220 of the piston-cylinder assembly 219 extends through an opening 221 in the bottom plate 190 and the central opening 195 in the bottom plate 194 of the movable well 185 and is secured at its upper end in a threaded bore in the underside of the hub 206. It will be appreciated that extension of the piston-cylinder assembly will move the lower bead clamp vertically with respect to the mounting well and independently of the movable well and bottom toe ring.

It is significant to note that with the bottom bead clamp 201 in its raised position and the movable well 185 in its lowered or registered position, access to the fasteners 217 may be had for easy bladder change.

The stroke of the piston-cylinder assembly 219, and accordingly the maximum height of the bottom bead clamp 201, is limited by an adjustable movable stop assembly shown generally at 225 in FIGS. 10 and 13. Such assembly includes a vertical rod 226 secured at its upper end in a threaded bore 227 in the underside of the hub 206, which extends downwardly through opening 195 in the bottom plate of the movable well 185 and opening 228 in the bottom plate 190 of the mounting well 180. The lower projecting end of the rod is threaded at 229 and has secured at its lowermost end a horizontal arm 230. Mounted at the outer and readily accessible and visible end of the arm 230 is another but shorter vertical threaded rod 232 on which is fixed drive sprocket 233. The drive sprocket 233 is connected by a chain 234 extending into the press to an internally threaded driven sprocket 235 on the threaded rod 226. The driven threaded sprocket supports thereabove a freely rotating stop washer 237 which is adapted to engage the underside of the bottom plate 190 of the mounting well 180 to limit vertical upward movement of the bottom bead clamp 201. The driven sprocket and thus the stop washer may be moved upwardly or downwardly on the rod 226 by rotating the drive sprocket 233, the drive sprocket being maintained in horizontal alignment with the driven sprocket as long as the thread turns per inch of the threaded rods 229 and 232 are the same. If desired, a wheel 238 may be connected to the drive sprocket to facilitate rotation thereof and a suitable scale 239 can be mounted on the annular plate for indicating proper adjustment heights. When adjusted, lock nut 240 can be tightened against the underside of arm 230 to preclude further rotation of the rod 232 and drive sprocket 234.

Reverting back to FIG. 9, it can be seen that the top bead clamp 202 engages the upper bead area of the bladder 203 between a lower clamp plate 244 and a cooperating upper clamp ring 245 which are detachably secured together by fasteners 246 for bladder change. The lower clamp plate has an upper annular flange 247 which interlocks with a mating flange 248 on a split collar 249 which can be tightened by a fastener 250 about the center post 200.

As was the case with the bottom bead clamp, the top bead clamp is selectively vertically movable by a vertical piston-cylinder assembly 251. As seen in FIG. 9, the center post 200 extends substantially the height of the center mechanism and somewhat beyond and is secured at its bottom end to the rod 252 of the piston-cylinder assembly 251. The cylinder 253 of the assembly 251 is mounted on and beneath the bottom plate 190 of the mounting well 180.

It is noted that the top clamp plate 244 includes a downward extension 254 adapted to engage the top of retainer 218. Thus, the stop 237 not only controls the height of the bottom clamp 201 when the assembly 219 is extended, but it also controls the lowermost position of the top clamp 202 when the assembly 251 is retracted. The elevation adjustment is readily achievable with the accessible and visible scale 239 and wheel 238.

It can also now be appreciated that the piston-cylinder assemblies 188, 189, 219 and 251 are all mounted on the bottom plate 191 of the mounting well 180 with the cylinders thereof extending downwardly from the bottom plate away from the mold cavity and bladder where high temperatures are encountered during cure. Accordingly, the mounting well serves as a heat shield to preserve the integrity of the hydraulic system. Further, to isolate the cylinders which preferably are hydraulic oil cylinders from the high temperatures, the bottom plate is provided at its peripheral edge with an annular groove 255 which is closed by an annular band 256 to form a passage through which cooling fluid is circulated to cool the bottom plate. Interior passages 257 may also be provided to cool more effectively the interior portion of the bottom plate. Such coolant passages extract heat from the plate 190 protecting the hydraulic fluid from heat degradation.

Reverting briefly to FIG. 5, it will be seen that the center post 200 extends above the upper bead clamp 202 to define a pilot 258 which is received in a pilot bushing 259 in the lower end of tubular pin 103 as the bead grip assembly 55 is lowered over the center post. Accordingly, the axis of the bead grip assembly can be precisely aligned with that of the center mechanism as the former is lowered over the latter. In like manner, the top press half may also be provided with a pilot bushing at its central axis for receipt of the pilot 258 as the press closes to align the center mechanism to the top press half and the mold parts symmetrically carried thereby.

IV. Bottom Toe Ring Lowering Assembly

Referring now to FIGS. 14–17, a bottom toe ring lowering assembly is designated generally by reference numeral 260 and interconnects the loader arm 56 when in its load position seen in FIG. 16 to the bottom toe ring 186 for simultaneously lowering the bottom toe ring along with the bead grip assembly after it has placed the lower bead of the green tire on the bottom toe ring. Such assembly 260 comprises a cable 262 pivotally connected at one end by a cable yoke 263 to the lower end of a vertical connecting rod 264 which passes through an opening 265 in the bottom plate 190 of mounting well 180. The connecting rod 264 is attached at its top end to the bottom plate 194 of the movable well 185 while the cable is reeved through pulleys first extending downwardly from the connecting rod to pulley 266, then horizontally outwardly to another pulley 267 and from there forwardly to yet another pulley 268 at the base of the stanchion 58. From pulley 268, the cable extends upwardly through the stanchion 58 to a pulley 269 mounted at the top of the stanchion which reverses the cable direction. From the top pulley 269, the cable runs downwardly along the outside of the stanchion and is connected by a cable yoke 270 to one end of a threaded rod 271. The other end of the threaded rod 271 is connected to the piston rod 272 of an air spring 273 which has its blind end connected at pivot 274 to a bracket 275 on the stanchion 58. The air spring maintains the cable under tension.

Secured to the rod 271 by nuts 276 and 277 is a trip plate 278 which is adapted to engage position switches 279 and 280 which are adjustably slidably mounted in a track 281 extending between brackets 282 and 283 on the stanchion. The position switches 279 and 280 will indicate when the toe ring 186 is in its down or up position, respectively.

The rod 271 also has threaded thereon a stop nut 285 adapted to engage a stop plate 286 secured to the loader arm 56. The top profile configuration of the stop plate is seen in FIGS. 15 and 16. When the loader arm is in the load position in the open press seen in FIGS. 15 and 16, the plate 286 will be vertically aligned with the top of stop nut 285 and as the loader arm is lowered, the stop plate 286 will engage and cause to move downwardly therewith the nut 285 thereby simultaneously uniformly lowering the bottom toe ring 186 along with the loader arm. Actually, the assembly 88 may stall out against the stop 285 with lowering of the loader simultaneously with the bottom toe ring being controlled by retraction of the assemblies 188 and 189. The stop nut 285 is adjusted on the threaded rod 271 so that the plate 286 will engage the nut just after the loader has properly positioned the lower bead of the green tire on or closely adjacent the bottom toe ring. The loader will continue to lower the tire until the toe ring itself is seated in the bottom mold part 187.

V. Press Adjustment For Symmetrical Bladder Insertion

It should now be appreciated that the various mechanical stops can be adjusted to achieve symmetrical bladder insertion. Although an arbitrary plane in the press may initially be chosen, the symmetrical plane is preferably determined by a marking at the center of the bladder and a comparison with a print mark on the interior of the tire. The wheel 238 is employed to make any required adjustment for a given size tire. It should also be noted that the top clamp assembly 202 may be adjustably positioned on post 200. This permits the bladder to be used as a conventional standing post bladder to be stripped upwardly from the tire and snaked into the tire around the top bead. Also, with the well, the bladder may be inserted from the bottom with the post first extending and the bladder then snaked into the tire around the bottom bead as the bottom assembly 201 elevates. Any of the three modes of bladder insertion may occur while the green tire is held by the tire loader and the bottom toe ring, all before the press closes.

VI. The Unloader

Regardless of the mode of bladder insertion or removal, there is illustrated in FIGS. 18 and 19 an unloader 294 suitable for use with the press incorporating the center mechanism disclosed herein. The unloader includes a recessed tire stop assembly 295 adapted to restrain the tire being removed from the press as the unloader is tilted to an inclined position.

The unloader is mounted on the rear of the press or the side opposite the loader on a horizontally rearwardly projecting beam 297 extending in cantilever fashion from the base. The beam includes two laterally extending horizontal rails 298 and 299, above and below which ride rollers 300 projecting inwardly from the side plates 301 and 302 of carriage 303. As illustrated there are eight such rollers 300, four for each rail.

The side plates project downwardly at the rear end of the unloader and are interconnected by transverse plate 306 to which is connected the rod 307 of piston-cylinder assembly 308. The piston-cylinder assembly is trunnion mounted at 309 to brackets 310 secured to the back of the press. The blind end of the cylinder assembly 308 may project into the interior of the press base through the window 37.

The side plates 301 and 302 are also connected by L-shape plate 312 to which is pivotally connected at 313 piston-cylinder assembly 314. The rod of the piston-cylinder assembly is pivotally connected at 316 to crank 317 which is keyed to transverse shaft 318 extending between the top projection of the plates as indicated. Extension and retraction of the piston-cylinder assembly will oscillate the shaft 318.

Adjustably axially secured to the transverse shaft 318 are roller bars 320 and 321, each of which includes a series of inwardly projecting rollers 322 which extend above the bars. Such bars include hubs keyed to the oscillating shaft 318 as indicated at 323. The phantom line position 324 seen in FIG. 19 illustrates the manner in which the distance between the roller bars along the oscillating shaft 318 may be adjusted. Accordingly, extension of the piston-cylinder assembly 314 will cause the roller bars to oscillate from the horizontal full line position seen in FIG. 18 to the inclined phantom line position 325.

In such inclined position, the discharge end of the roller bars seen at 327 will move downwardly to a position near the bottom and normal to projecting tire stops 328 and 329, forming part of the assembly 295. Each tire stop comprises an L-shaped rod with the long leg of the L being pivoted at its proximal end to the shaft 318. Such long legs of the L are also interconnected by a tubular frame 332 from which extends a dogleg support arm 333. A cam roller 334 on the end thereof normally rides on linear cam 335 mounted on top of the tubular frame 297. The horizontal top surface of such cam holds the tire stop in the full line position seen in FIG. 18. However, when the unloader retracts the cam rides off beveled or cam end 336 and is caught against stop 337 causing the tire stops to pivot in a clockwise direction about the shaft 318 to clear the plane of the rollers 322 even in the inclined position of the roller bars permitting a tire then to roll free when the unloader is fully retracted.

In operation, when the press is open, bottom toe ring 186 elevates to, for example, the position seen at 340 stripping the tire from the bottom mold part. Retraction of the piston-cylinder assembly 308 causes the unloader to move into the press with the plane of the rollers 322 supported by the parallel bars 320 and 321 beneath the tire as seen. The bars will straddle the sleeve or well on which the bottom toe ring is supported. As the unloader moves into the press the roller 334 will ride up the cam surface 336 moving the tire stops from the position seen in phantom lines to the full line position. When the unloader is in the press, the piston-cylinder assembly 314 is extended tilting the roller bars to lift the tire from the bottom toe ring over the projecting post 200, even in its extended mode, to permit the same to roll against the projecting portions of the tire stop assembly 295. Extension of the piston-cylinder assembly 308 moves the tire and the unloader out of the press and movement to the end of its stroke causes the tire stop assembly to pivot out of the way releasing the tire.

VII. Tire Press Operation

An exemplary operation of the tire press in accordance with the concepts of the invention is depicted by the sequence of operational views, FIGS. 20-30 of the drawing. Although variation may be apparent to persons skilled in the art, the following description constitutes a preferred sequence.

FIG. 20 depicts a segmented mold in a closed position with a tire T1 received therein. The bladder 203 is in its expanded position for circulation therein of curing media for high pressure shaping and curing of the tire. Forwardly of the press or to the left in FIG. 20, a green tire T2 has already been lifted from a loader stand 390 and is held at its upper bead by the loader shoes 115 of the bead grip assembly 55. The tread positioning ring 167 has also been extended to locate or identify precisely the tread transaxial plane of symmetry of green tire T2 in relation to the bead grip assembly. A second green tire T3 has also been placed in the loader stand and is ready to be picked up by the loader in the next cycle.

After the cure is completed, the cured tire T1 is stripped first from the tread mold parts 391 and top mold part 392 as the top mold half 44 is raised to its open position seen in FIG. 21. The bottom toe ring 186 is then raised to strip the tire from the bottom mold part 187. Just prior to raising the bottom toe ring, the bladder bead clamps 201 and 202 may be moved toward each other slightly to pull the bladder 203 from the interior cavity of the tire T1 thereby freeing it from the tire so that the bladder is easily pulled out of the tire to the folded position shown in the elevated well or sleeve as the toe ring 186 is raised.

At this point in the cycle, the unloader 294 moves into the press beneath the tire T1 as seen in FIG. 22. The unloader 294 is then tilted to lift the tire from the bottom toe ring 186. As the tire clears the toe ring, it will roll down the roller platform until it engages stop assembly 295 as seen in FIG. 23. The stop will hold the tire on the unloader as it is withdrawn from the press to the position seen in FIG. 24 at which time the stop is pulled away to discharge the tire from the unloader.

As the tire unloader 294 is being moved rearwardly out of the press, the bead grip assembly 55 may be simultaneously swung into the press to bring the green tire T2 held thereby generally into axial alignment with the press axis as seen in FIG. 24. The loader may now begin its downward movement to position the lower bead of the green tire on or close to the bottom toe ring 186 as seen in FIG. 25. Once the FIG. 25 position is reached, the bottom toe ring lowering assembly will cause the bottom toe ring to move uniformly thereafter with the loader until the toe ring registers with the bottom mold part 187 as seen in FIG. 26. It will be appreciated that as the loader and toe ring together cooperate to hold firmly and lower the green tire, the bladder 203 will simply fall from its folded position into the green tire T2.

At this point, the tread positioning ring 167 will have brought the tread transaxial plane of symmetry of the tire into alignment with the plane indicated at 397 in FIG. 27. The bead grip assembly 55 is also brought into precise coaxial alignment with the press axis as the post pilot 258 enters into the pilot bushing 259 in the loader arm. Accordingly, the green tire T2 is now precisely located transaxially and axially in the press for insertion of the bladder therein. The bladder 203 with the bead clamps therefor closely adjacent one another and symmetrically on opposite sides of the center plane 397 may now be inflated by introducing fluid into the interior of the bladder.

As illustrated in FIG. 27, initial inflation is under modest pressure to fill out the bladder to its toroidal shape depicted by dashed line position 1 with the medial portion of the bladder just contacting the interior of the tread portion of the green tire T2 at the tread transaxial plane of symmetry which is essentially coincidental with the transaxial plane of symmetry of the bladder. Further inflation of the bladder will cause the bladder to contact the inner surface of the green tire progressively and symmetrically in axially opposite directions from the transaxial plane 397 of the tire tread which progressive movement is depicted by the dashed line positions 2-4. It should be noted that as the bladder is inflated, the bottom and top bead clamps 201 and 202 may move progressively symmetrically apart under the precise control of their hydraulic cylinder assemblies to obtain the desired symmetrical insertion of the bladder from the plane 397 toward the beads. Such symmetrical progressive expansion of the bladder in the green tire precludes the entrapment of air between the bladder and tire and obviates the imposition of uneven stresses in the tire and in the bladder itself thereby leading to more uniform tire production and longer bladder life.

As seen in FIG. 28, the bladder or bead clamps may go through one or more shaping pauses or manipulations as is presently conventional, if desired, but such should not be required with the symmetrical insertion technique as illustrated in FIG. 27. Accordingly without such manipulative steps the press can be closed more quickly conserving significant energy and cycle time.

With the bladder fully inflated as seen in FIG. 29, the bead grip assembly 55, after the loader shoes are retracted, is elevated and then swung out of the press to pick up the next green tire T3 to be cured. The press may now begin to close, the green tire T2 being held in precise alignment with the bottom mold part 187 by the bladder 203 and bottom toe ring 186 so that the upper bead of the green tire will engage properly the top toe ring 399. Just prior to seating of the upper bead of the green tire in the top toe ring, it will be appreciated that the center post pilot 258 will engage a pilot bushing 400 in the top mold half 43 to ensure precise axial alignment of the green tire with respect thereto. In FIG. 30, the press is fully closed and the bead grip assembly 55 has picked up the next green tire T3 to be cured.

Although the aforedescribed symmetrical bladder insertion mode is preferred, other modes of bladder insertion described above may be achieved by the press described herein.

Other modes of applying the principle of the invention may be employed, change being made as regards the details described, provided the features stated in any of the following claims or the equivalent of such be employed.

We, therefore, particularly point out and claim as our invention:

1. A tire curing press assembly comprising mating mold sections, means to open and close said mold sections, a center mechanism including an inflatable shaping and curing bladder, bead grip means for engaging the interior underside of the upper bead of a green tire, and means for engaging and holding the tread of the green tire away from said bead grip means to hold open the tire with the upper bead and tread held apart in fixed axial relation to one another to facilitate insertion of said bladder into the green tire.

2. The assembly of claim 1 wherein said means for holding includes tread engaging means for setting the position of the tread with respect to said bead grip means to identify precisely the transaxial center plane of symmetry of the green tire in relation to said bead grip means.

3. The assembly of claim 2 wherein said bladder when inflated has a corresponding center plane, and further comprising means relatively to position the respective center planes of the green tire and bladder.

4. The press of claim 3 further comprising means precisely to center said bead grip means to said center mechanism, said means to center including an axial pilot on said bead grip means or center mechanism and a pilot bushing in the other.

5. The press of claim 3 wherein said means relatively to position such center planes includes a horizontally and vertically movable loader, said head grip means and register means being carried by said loader.

6. In combination, a tire curing press, a center mechanism for said press, said center mechanism comprising a post and shaping bladder, a top bladder clamp mounted on and secured to said post, a bottom bladder clamp slidably mounted on said post, mechanical stop means within said press to limit elevation of said bottom bladder clamp to obtain a shaping reference point with the top bladder clamp down and butted thereagainst, and means externally of said press operably connected to said mechanical stop means for adjusting said mechanical stop means.

7. The combination set forth in claim 6 wherein said bottom clamp and post are actuated by respective double acting hydraulic cylinder assemblies.

8. The combination set forth in claim 7 wherein said cylinder assemblies are mounted on a plate externally of the center mechanism.

9. The combination set forth in claim 8 including means to extract heat from said plate.

10. The combination set forth in claim 6 wherein said means for adjusting includes drive means for said stop.

11. The combination set forth in claim 10 including a scale for said drive means wherein said reference point may be obtained on said scale.

12. A tire curing press comprising top and bottom mating mold sections, means to open and close said mold sections, a center mechanism including a shaping and curing bladder and relatively vertically movable top and bottom bladder rings for said bladder, said bladder having a horizontal center plane when inflated, means to position a tire in the press, and means to locate said bladder rings against each other at a reference plane to position the horizontal center plane of the bladder within the axial extent and in precise relationship to the transaxial center line of the tire prior to pressure shaping the bladder into the tire.

13. The press of claim 12 wherein said bladder rings move apart as said bladder is inflated to axially spaced stop positions.

14. The press of claim 12 wherein said means to locate includes adjustable stop means for limiting elevation of said bottom bladder ring to define said reference plane with the top bladder ring down and butted thereagainst.

15. A tire press comprising a bottom press half with a top press half movable vertically to open and close the press, a mounting well in said bottom press half, a center mechanism mounted in said mounting well, said center mechanism including a shaping and curing bladder and means operative to manipulate said bladder during tire loading and unloading, said means including at least one piston-cylinder assembly, the cylinder of said assembly being mounted on and beneath said mounting well and the rod of said assembly extending through said mounting well, and means for cooling said mounting well to isolate the fluid in said piston-cylinder assembly from the heat in the press.

16. The press of claim 15 wherein said means for cooling includes cooling passages in said mounting well for circulation of coolant therethrough.

17. The press of claim 16 wherein said mounting well has a bottom plate on which said cylinder is mounted and through which said rod extends, and said cooling passages are in said bottom plate.

18. The press of claim 15 further comprising a movable well mounted in said mounting well for telescopic vertical movement.

* * * * *